(12) United States Patent
Takeichi

(10) Patent No.: US 12,288,232 B2
(45) Date of Patent: Apr. 29, 2025

(54) SERVER AND NON-TRANSITORY COMPUTER-READABLE STORAGE MEDIUM STORING COMPUTER-READABLE INSTRUCTIONS

(71) Applicant: BROTHER KOGYO KABUSHIKI KAISHA, Nagoya (JP)

(72) Inventor: Masashi Takeichi, Gifu (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 379 days.

(21) Appl. No.: 17/678,421

(22) Filed: Feb. 23, 2022

(65) Prior Publication Data

US 2022/0277367 A1 Sep. 1, 2022

(30) Foreign Application Priority Data

Feb. 26, 2021 (JP) ................................. 2021-030154

(51) Int. Cl.
G06Q 30/00 (2023.01)
G06Q 10/083 (2023.01)
G06Q 30/0601 (2023.01)

(52) U.S. Cl.
CPC ....... *G06Q 30/0601* (2013.01); *G06Q 10/083* (2013.01)

(58) Field of Classification Search
CPC ................................................ G06Q 30/06–08
See application file for complete search history.

(56) References Cited

U.S. PATENT DOCUMENTS

| | | | | |
|---|---|---|---|---|
| 5,832,301 A | * | 11/1998 | Yamaguchi | G06F 3/1288 710/48 |
| 7,372,588 B1 | * | 5/2008 | Jeong | G06F 3/1232 358/1.14 |
| 2014/0282996 A1 | * | 9/2014 | Mori | H04N 1/4433 726/10 |

(Continued)

FOREIGN PATENT DOCUMENTS

JP 2014-178984 A 9/2014

OTHER PUBLICATIONS

Allworth, John, "Design and Development Procedures for Microprocessor Systems", University of Manchester, Proquest Dissertations & Theses, 1978 (Year: 1978).*

*Primary Examiner* — Ethan D Civan
(74) *Attorney, Agent, or Firm* — Scully, Scott, Murphy & Presser, PC

(57) ABSTRACT

A controller of a server is configured to: in a state where first combination data including first account data and first device-identification data is stored in a memory of the server in association with each other, receive a first request including second account data from a first external device; determine whether priority assigned to the second account data is higher than priority assigned to the first account data; based on a determination that the priority assigned to the second account data is higher than the priority assigned to the first account data, replace the existing first account data with the second account data, thereby storing the second account data in association with the first device-identification data; and based on a determination that the priority assigned to the second account data is not higher than the priority assigned to the first account data, not replace the existing first account data.

12 Claims, 10 Drawing Sheets

(56) References Cited

U.S. PATENT DOCUMENTS

2015/0193825 A1\* 7/2015 Song ................ G06Q 30/0276
                                                        705/14.66
2017/0161719 A1\* 6/2017 Bhatia ................ G06Q 20/327

\* cited by examiner

FIG. 2

| ADMINISTRATION DATA | | SERIAL NUMBER | DEVICE ID | DEVICE TOKEN | ACCESS TOKEN | SERVER DATA | PRINT ADDRESS |
|---|---|---|---|---|---|---|---|
| ADMINISTRATION ACCOUNT | PRIORITY | | | | | | |
| MA3 | 2 | SN1 | dv1 | DT1 | AT1 | SI1, SI2 | PA1 |
| ... | ... | ... | ... | ... | ... | ... | ... |

240

| APPLICATION DATA | ADMINISTRATION ACCOUNT |
|---|---|
| AP1 | MA3 |
| ... | ... |

340

| MAIL ADDRESS | PASSWORD | ADDRESS DATA | SERVICE ACCOUNT | ADMINISTRATION ACCOUNT |
|---|---|---|---|---|
| AD1 | PW1 | AI1 | SA1 | MA3 |
| ... | ... | ... | ... | ... |

440

(CASE E)

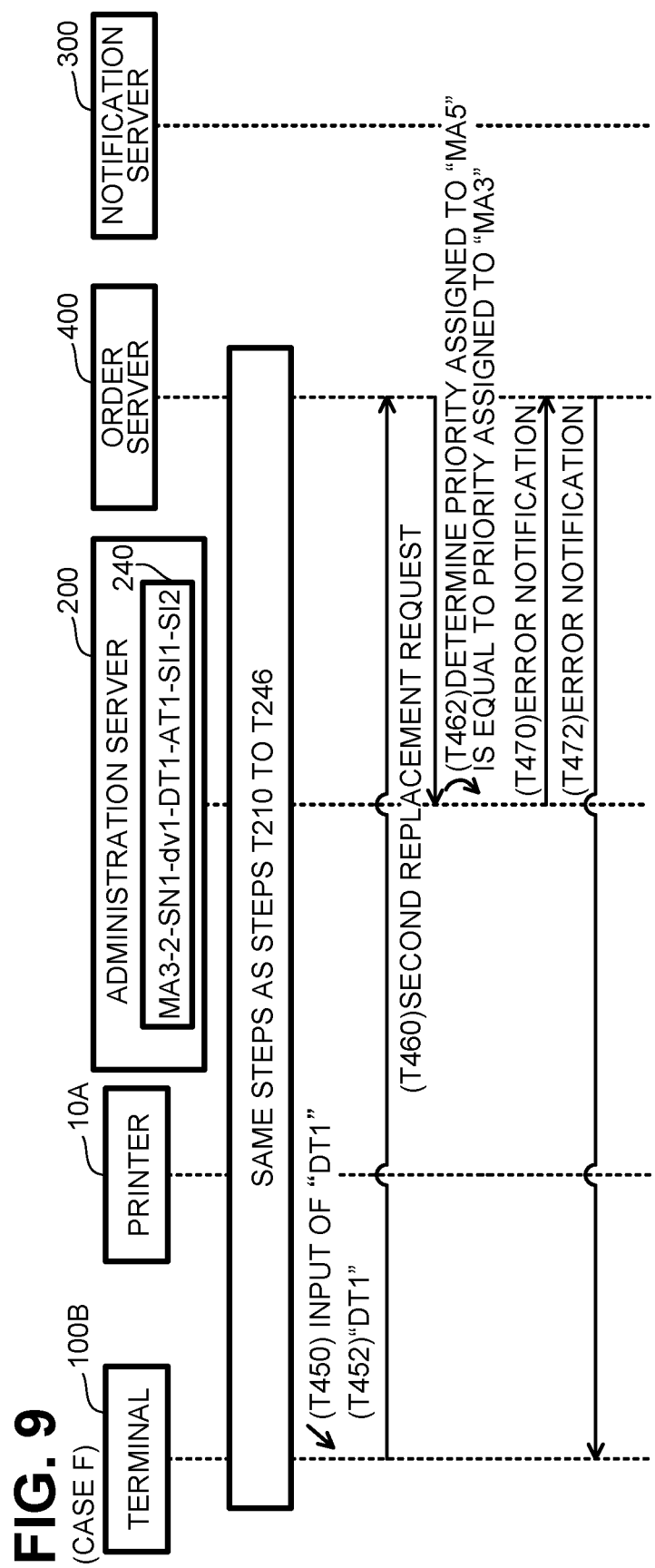

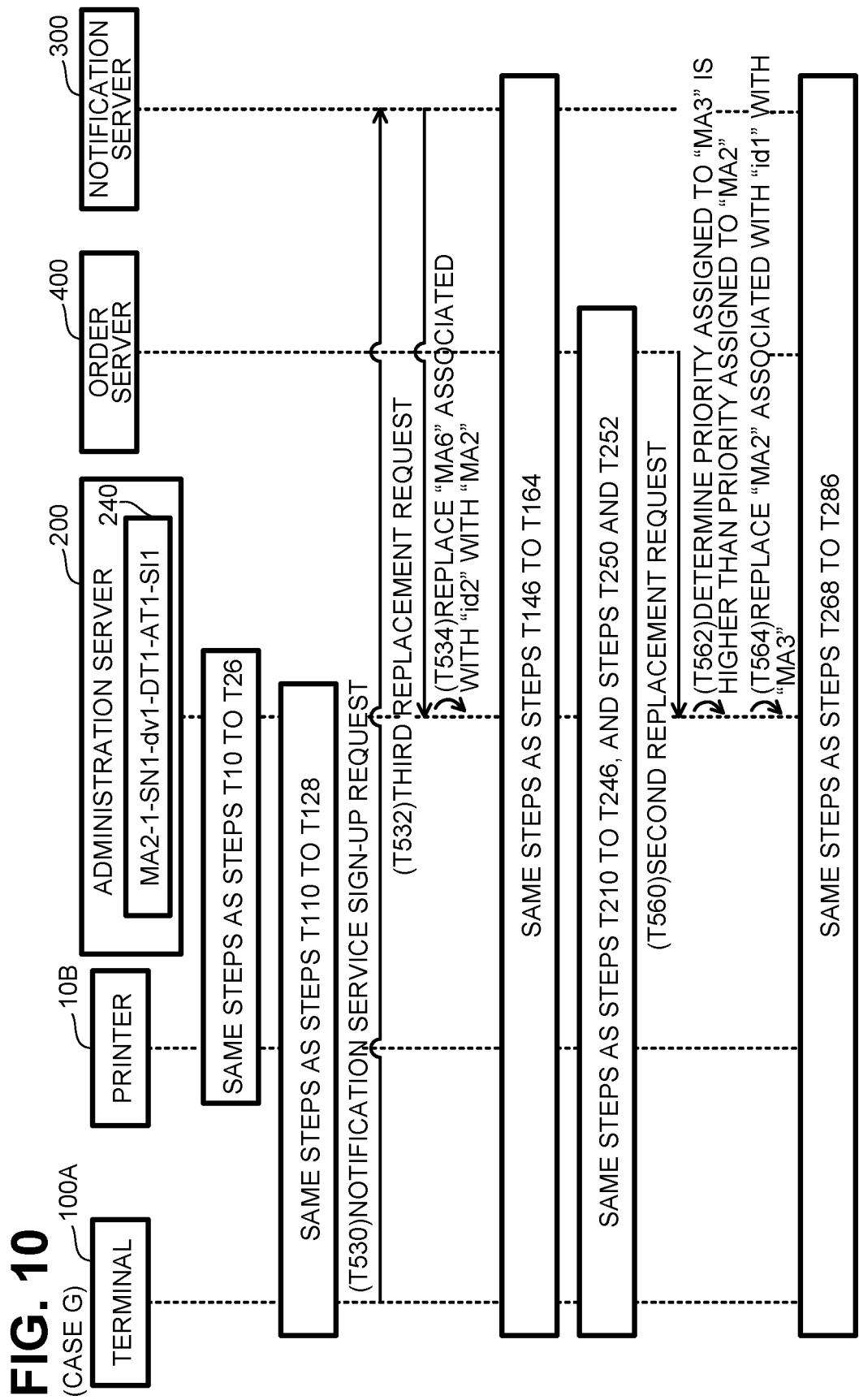
FIG. 10 (CASE G)

SERVER AND NON-TRANSITORY COMPUTER-READABLE STORAGE MEDIUM STORING COMPUTER-READABLE INSTRUCTIONS

CROSS-REFERENCE TO RELATED APPLICATION

This application claims priority from Japanese Patent Application No. 2021-030154 filed on Feb. 26, 2021, the content of which is incorporated herein by reference in its entirety.

TECHNICAL FIELD

Aspects of the disclosure relate to a technique for replacing account data stored in a server in association with device identification data for identifying a communication device.

BACKGROUND

A known a network system includes a server, a data processing device, and an information device. In response to receiving a request to generate an account from the data processing device, the server generates and transmits an account and a PIN code to the data processing device. In response to accepting input of the PIN code, the information device transmits connection request data including a device ID to the server. In response to receiving the connection request data from the information device, the server stores the account and the device ID in association with each other.

SUMMARY

Aspects of the disclosure provide a server that may appropriately replace an existing account data associated with device identification data with another account data.

A server may include memory and a controller. The controller may be configured to: in a state where first combination data is stored in the memory, receive a first request from a first external device, the first combination data including first account data and first device-identification data in association with each other, the first device-identification data identifying a first communication device, the first request including second account data different from the first account data and requesting replacement of the first account data associated with the first device-identification data in the first combination data with the second account data; in response to receiving the first request from the first external device, determine whether priority assigned to the second account data included in the first request is higher than priority assigned to the first account data associated with the first device-identification data stored in the memory; based on a determination that the priority assigned to the second account data included in the first request is higher than the priority assigned to the first account data associated with the first device-identification data stored in the memory, replace the existing first account data stored in the memory with the second account data included in the first request, thereby storing the second account data in the memory in association with the first device-identification data; and based on a determination that the priority assigned to the second account data included in the first request is not higher than the priority assigned to the first account data associated with the first device-identification data stored in the memory, not replace the existing first account data stored in the memory with the second account data included in the first request.

The server may thus appropriately replace the existing account data associated with device identification data with another account data.

Control methods and computer programs for implementing the above-described server, and non-transitory computer-readable storage media storing the computer programs may have novelty and utility. Communication systems including the above-described server, a first communication device, and a first external device may also have novelty and utility.

BRIEF DESCRIPTION OF THE DRAWINGS

FIG. 2 shows examples of an administration table, a notification table, and an order table.

FIG. 9 is a sequence diagram of Case F in which the sign-up process for the order service fails.

FIG. 10 is a sequence diagram of Case G illustrating a sequence of another sign-up process for the order service.

DETAILED DESCRIPTION

Illustrative Embodiment

Figure 1:
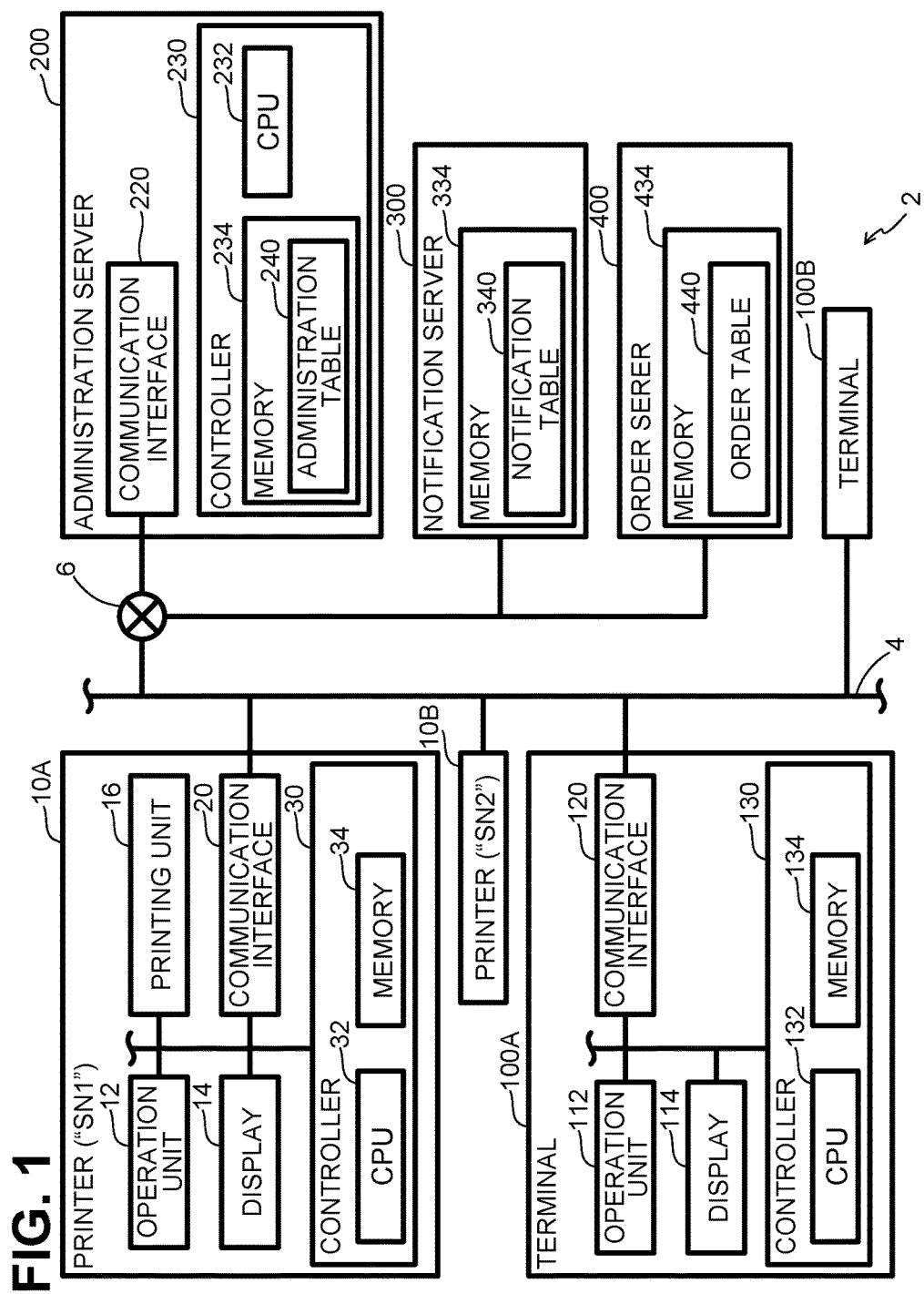
FIG. 1 illustrates a configuration of a communication system.

Configuration of Communication System 2: FIG. 1

As illustrated in FIG. 1, a communication system 2 includes printers 10A, 10B, terminals 100A, 100B, an administration server 200, a notification server 300, and an order server 400. The printers 10A, 10B and the terminals 100A, 100B are connected to a LAN 4. The printers 10A, 10B and the terminals 100A, 100B are communicable with each other via the LAN 4. The LAN 4 is connected to the Internet 6. The printers 10A, 10B, the terminals 100A, 100B, the administration server 200, the notification server 300, and the order server 400 are connected to the Internet 6. The printers 10A, 10B, the terminals 100A, 100B, the administration server 200, the notification server 300, and the order server 400 are communicable with each other via the Internet 6. Hereinafter, the printers and the terminals may be indicated by respective common reference numerals (e.g., a printer 10 and a terminal 100) when not distinguishing therebetween.

Configuration of Printers 10A, 10B

The printer 10A may be a peripheral device (e.g., a peripheral device for a general-purpose computer) having a printing function. The printer 10A may be a multifunction device having a scanning function, a facsimile communication function, and other functions in addition to the printing function. The printer 10A further has a mail printing function. The mail printing function enables printing of an image corresponding to an image file attached to an e-mail. The printer 10A includes an operation unit 12, a display 14, a printing unit 16, a communication interface 20, and a controller 30. The printer 10A has a serial number "SN1".

The operation unit 12 includes keys or buttons. The operation unit 12 enables a user to input various instructions to the printer 10A. The display 14 is configured to display various information thereon. The display 14 may be a touch screen. The printing unit 16 may be an inkjet or electrophotographic printing mechanism. The communication interface 20 is connected to the LAN 4. The communication interface 20 may be a wireless or wired interface.

The controller 30 includes a CPU 32 and a memory 34. The CPU 32 executes various processing in accordance with a program 36 stored in the memory 34. The memory 34 may be a volatile or nonvolatile memory. The printer 10B has the same configuration as that of the printer 10A. The printer 10B has a serial number "SN2".

Configurations of Terminals 100A, 100B

The terminal 100A may be a mobile device such as a cellular phone, a smartphone, a personal digital assistant, a mobile music player, or a mobile video player. The terminal 100A includes an operation unit 112, a display 114, a communication interface 120, and a controller 130.

The operation unit 112 includes buttons and a touch screen that enable the user to operate the terminal 100A. The display 114 is configured to display various information thereon. The communication interface 120 is connected to the LAN 4. The controller 130 includes a CPU 132 and a memory 134. The CPU 132 executes various processing in accordance with an OS program 140, a printer application 142, and a browser application 144 that are stored in the memory 134. The memory 134 may be a volatile or nonvolatile memory.

The OS program 140 realizes basic operations of the terminal 100A. The printer application 142 enables the user to receive services relating to the printer 10 from the administration server 200, the notification server 300, and the order server 400. The printer application 142 may be downloaded from a particular server provided on the Internet 6 by a vendor of the printer 10 and installed on the terminal 100A, or may be installed on the terminal 100A from a medium packaged with the printer 10. The browser application 144 enables the user to browse web pages. The terminal 100B has the same configuration as that of the terminal 100A.

Configuration of Administration Server 200

The administration server 200 is configured to manage data relating to the printers 10. The administration server 200 provides a mail printing service, a notification service, and an order service. The mail printing service provides a particular service using the mail printing function of the printer 10. The notification service provides a particular notification to the user. The particular notification indicates that a remaining life of a particular consumable item (e.g., a toner cartridge or an ink cartridge) used in the printer 10 has reached a threshold. The order service enables automatic ordering and delivery of a spare consumable item in response to the remaining life of a particular consumable item used in the printer 10 having reached the threshold. The administration server 200 is provided on the Internet 6 by the vendor of the printer 10. In another example, the administration server 200 may be provided by a server provider different from the vendor. The administration server 200 includes a communication interface 220 and a controller 230.

The communication interface 220 is connected to the Internet 6. The controller 230 includes a CPU 232 and a memory 234. The CPU 232 executes various processing in accordance with a program 236 stored in the memory 234. The memory 234 may be a volatile or nonvolatile memory. The memory 234 stores an administration table 240 in addition to the program 236.

Configuration of Notification Server 300

The notification server 300 provides the notification service. The notification service is provided by the administration server 200 and the notification server 300. The notification server 300 is provided on the Internet 6 by the vendor of the printer 10. In another example, the notification server 300 may be provided by a server provider different from the vendor. The notification server 300 includes a memory 334 storing a notification table 340.

Configuration of Order Server 400

The order server 400 provides the order service. The order service is provided by the administration server 200 and the order server 400. The order server 400 is provided on the Internet 6 by the vendor of the printer 10. In another example, the order server 400 may be provided by a server provider different from the vendor. The order server 400 includes a memory 434 storing an order table 440.

Contents of Administration Table 240, Notification Table 340, and Order Table 440

Referring to FIG. 2, a description will be provided on contents of the administration table 240 in the administration server 200, contents of the notification table 340 in the notification server 300, and contents of the order table 440 in the order server 400.

In the administration table 240, administration data, a serial number, a device ID, a device token, an access token, server data, and a print address are stored in association with each other. The administration data includes an administration account and priority. The administration account is used for managing data associated therewith in the administration table 240. The priority is used for determining whether or not to replace existing administration data associated with a device ID associated with the priority. The device ID identifies a particular printer in the administration server 200. The device token is used in authentication of a device ID associated therewith and is used for allowing replacement of the existing administration account associated therewith. The access token may be authentication data to be used for establishing an XMPP connection between the administration server 200 and a particular printer 10. The administration account, the device ID, the device token, and the access token are unique data generated by the administration server 200. For example, the administration server 200 is configured to generate a device ID using a serial number. The server data may be data relating to a server such as an URL of a server. For example, the server data may be an URL of the notification server 300 or an URL of the order serer 400. The print address may be an e-mail address for identifying a printer 10 that is to perform the mail printing function.

In the notification table 340, application data and an administration account are stored in association with each other. The application data may be data relating to an application that has been installed on a terminal, and may be used for transmitting, to the application, for example, notification data relating to a consumable item for a printer.

In the order table 440, a mail address, a password, address data, a service account, and an administration account are stored in association with each other. The address data indicates an address of a user. The service account may be used for managing data associated therewith in the order table 440. The service account is unique data generated by the order server 400. For example, the order server 400 is configured to generate a service account using an e-mail address included in user data. Hereinafter, an e-mail address, a password, and address data may be collectively referred to as user data.

Specific Example Cases A to G; FIGS. 3 to 10

Referring to FIGS. 3 to 10, a description will be provided on specific example Cases A to G implemented by the communication system 2.

Figure 3:
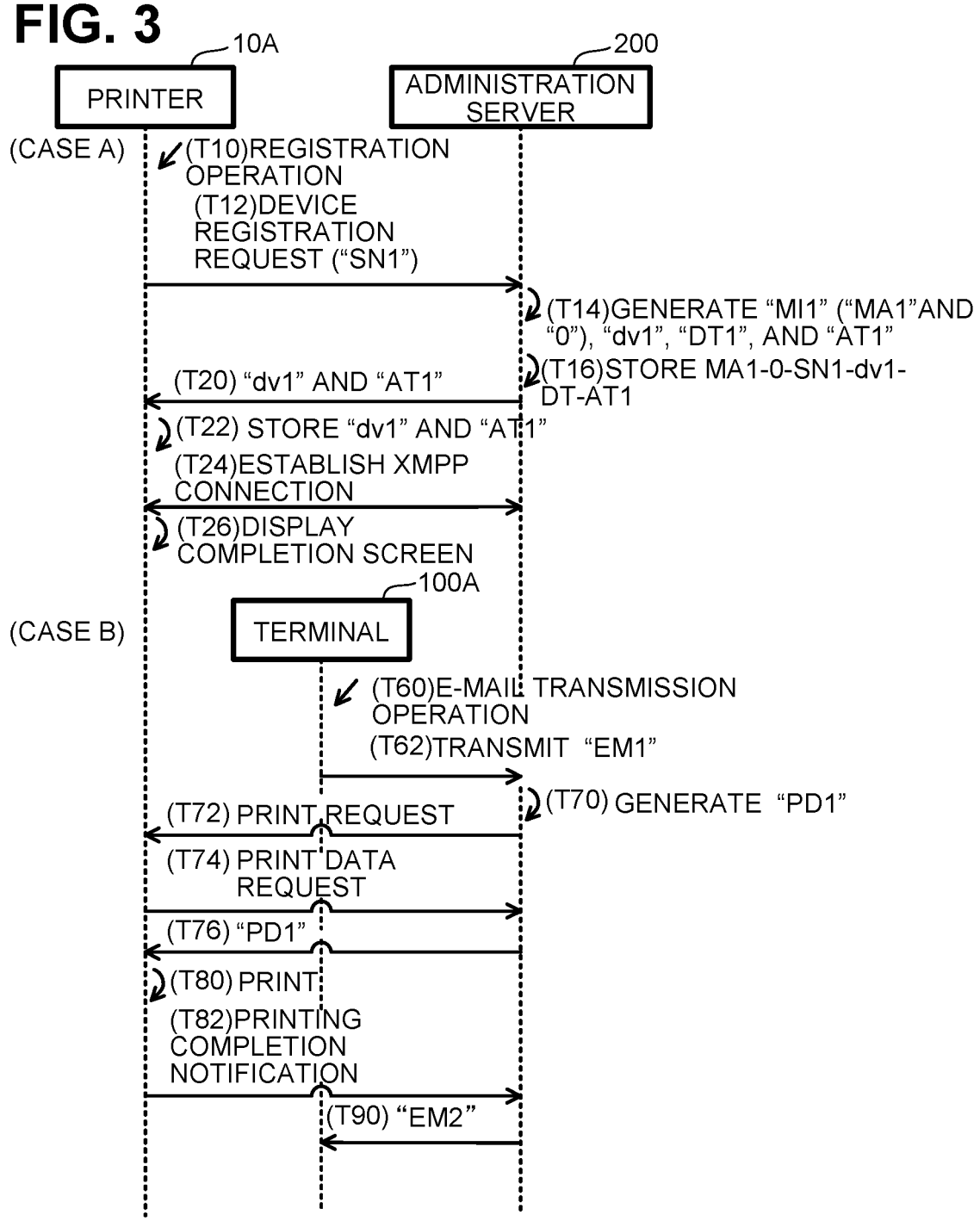
FIG. 3 is a sequence diagram of Case A and Case B, wherein Case A illustrates a sequence of a sign-up process for a mail printing service and Case B illustrates a sequence of the mail printing service.

Example Case A; FIG. 3

Referring to FIG. 3, a description will be provided on Case A illustrating a sequence of a sign-up process for the mail printing service. In the description below, each device (e.g., the printer 10) but not a CPU of each device (e.g., the CPU 32 of the printer 10) is regarded as a doer of actions. In addition, the printer application 142 is regarded as a doer of processing executed by the CPU 132 of the terminal 100 using the printer application 142. The browser application 144 is regarded as a doer of processing executed by the CPU 132 of the terminal 100 using the browser application 144. In FIGS. 3 to 10, communication performed by the browser application 144 is indicated by a thick line, and communication performed by the printer application 142 is represented by a thin line. Communication is performed by each device via its communication interface (e.g., the communication interface 120 of the terminal 100). Therefore, in the following description, the phrase "via the communication interface" may be omitted when processing relating to communication performed via the communication interface is described.

In response to accepting a registration operation for registering the printer 10A with the administration server 200 in step T10, the printer 10A transmits a device registration request to the administration server 200 in step T12. The device registration request includes the serial number "SN1". The device registration request may be a signal requesting registration of the printer 10A with the administration server 200.

In response to receiving the device registration request from the printer 10A in step T12, the administration server 200 generates administration data "MI1" a device ID "dv1", a device token "DT1", and an access token "AT1" in step T14. The administration data "MI1" includes an administration account "MA1" and priority "0" associated with each other. Subsequent to step T14, in step T16, the administration server 200 stores the administration data "MI1", the serial number "SN1", the device ID "dv1", the device token "DT1", and the access token "AT1" in the administration table 240 in association with each other. Subsequent to step T16, in step T20, the administration server 200 transmits the device ID "dv1" and the access token "AT1" to the printer 10A.

In response to receiving the device ID "dv1" and the access token "AT1" from the administration server 200 in step T20, the printer 10A stores the device ID "dv1" and the access token "AT1" in the memory 34 in step T22 and then establishes an XMPP connection with the administration server 200 using the access token "AT1" in step T24. Through the XMPP connection, the administration server 200 is enabled to transmit a request to the printer 10A through a firewall of the LAN 4 to which the printer 10A belongs (e.g., a firewall implemented by a router) without receiving a request from the printer 10A. The way to transmit a request from the administration server 200 to the printer 10A may be implemented by another way instead of the XMPP connection. For example, a connection according to HTTPS may be established between the printer 10A and the administration server 200. Subsequent to step T24, the printer 10A displays a completion screen in step T26.

Example Case B; FIG. 3

Referring to FIG. 3, a description will be provided on Case B illustrating a sequence of the mail printing service. Case B may start with the state after Case A is completed, more specifically, the state where the serial number "SN1" of the printer 10A and the device ID "dv1" are stored in the administration server 200 in association with each other, and the printer 10A has received the device ID "dv1" from the administration server 200. After all steps of Case A are completed, the administration server 200 generates a print address "PA1" and stores the print address "PA1" in the administration table 240 in association with the administration account "MA1". Then, the administration server 200 transmits, to the printer 10A, print data including the print address "PA1" as a text string. In this case, the printer 10A prints an image corresponding to the print data. This allows the user to be notified the print address "PA1".

In response to accepting an e-mail transmission operation in step T60, the terminal 100A transmits an e-mail "EM1" to the administration server 200 in step T62. The e-mail transmission operation instructs the terminal 100A to transmit the e-mail "EM1" including the print address "PA1" as a destination address and to which an image file "F1" is attached.

In response to receiving the e-mail "EM1" in step T62, the administration server 200 identifies the print address "PA1" that is the destination address of the e-mail "EM1". Subsequent to step T62, the administration server 200 identifies, in the administration table 240, the device ID "dv1" associated with the identified print address "PA1". The administration server 200 further identifies the printer 10A identified by the device ID "dv1" as a target printer. Next, in step T70, the administration server 200 converts the image file "F1" attached to the e-mail "EM1" to generate print data "PD1". Subsequent to step T70, the administration server 200 transmits a print request to the printer 10A in step T72. Subsequent to step T72, the administration server 200 receives a print data request from the printer 10A in step T74. Subsequent to step T74, the administration server 200 transmits the print data "PD1" to the printer 10A in step T76.

In response to receiving the print data "PD1" from the administration server 200 in step T76, the printer 10A prints an image corresponding to the print data "PD1" in step T80. That is, the printer 10A executes the mail printing function. Subsequent to step T80, the printer 10A transmits, to the administration server 200, a printing completion notification that printing has completed, in step T82.

In response to receiving the printing completion notification from the printer 10A in step T82, the administration server 200 creates an e-mail "EM2". In step T90, the administration server 200 transmits the e-mail "EM2" to the terminal 100A. The e-mail "EM2" includes an e-mail address assigned to a user of the terminal 100A as a destination address, and a message that printing has been completed in a mail body. The user of the terminal 100A may be enabled to be notified, when the user opens the e-mail "EM2", that the mail printing function has been executed. As described above, the administration account is not used in the mail printing service.

Figure 4:
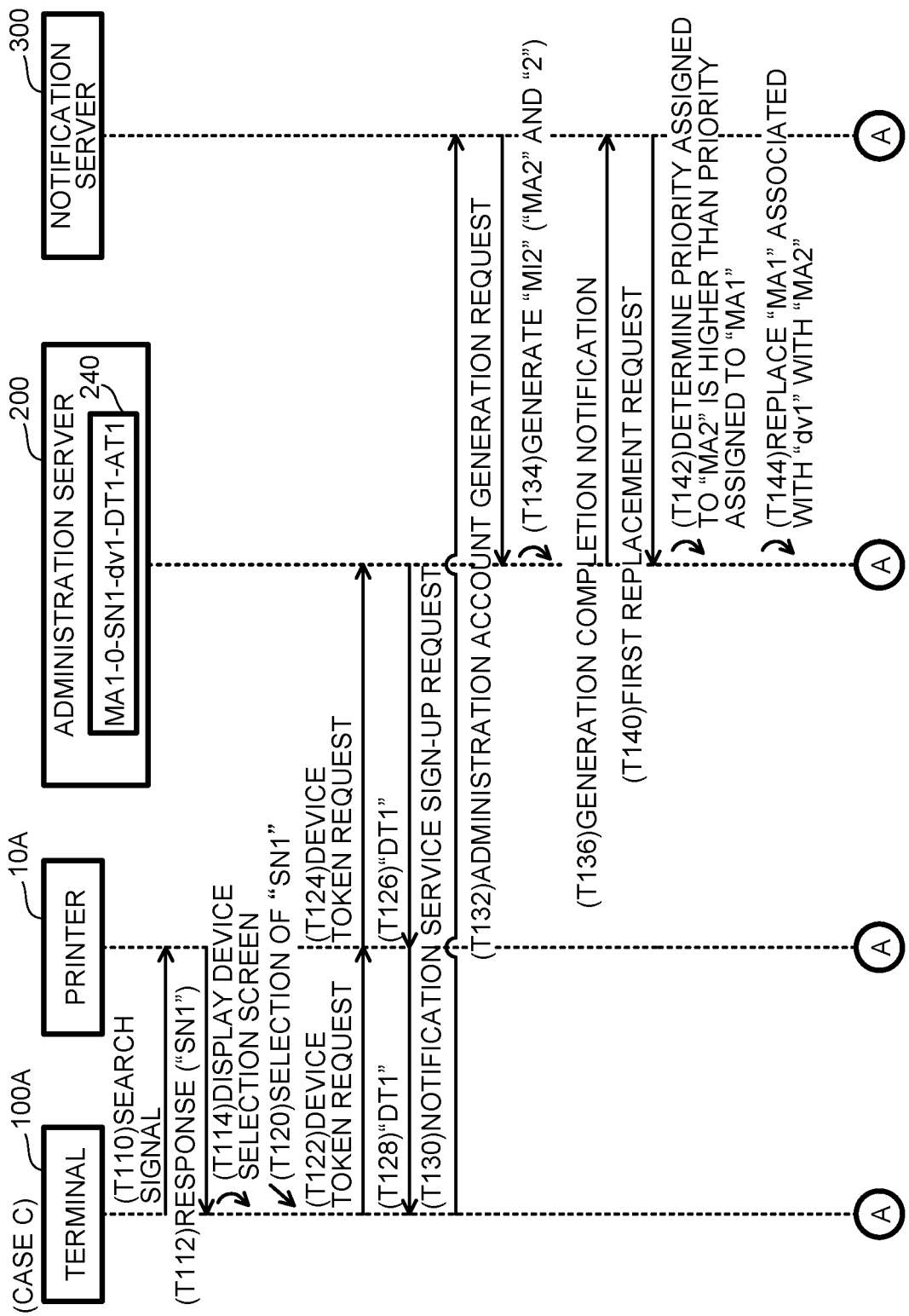
FIG. 4 is a sequence diagram of Case C illustrating a sign-up process for a notification service.
Figure 5:
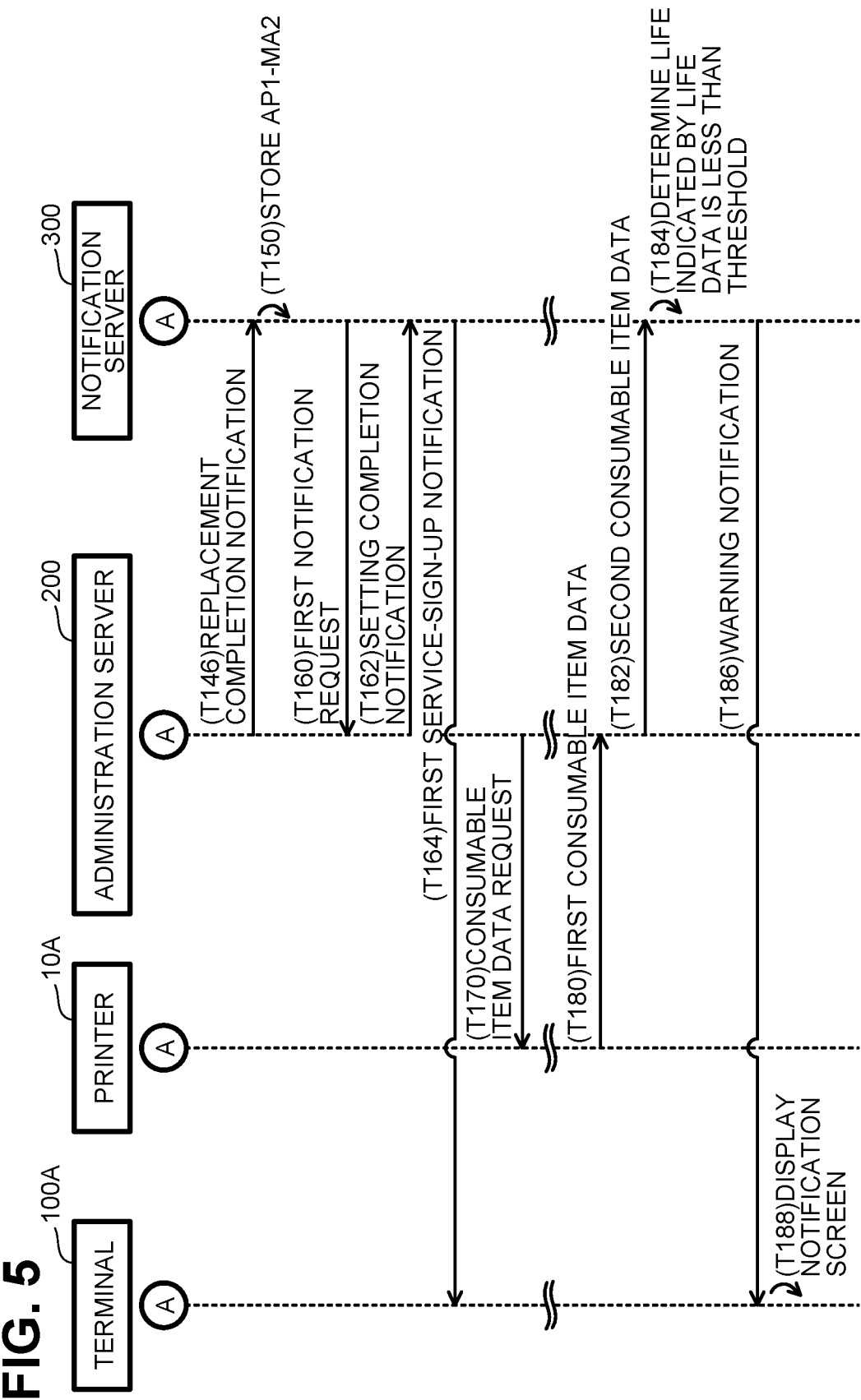
FIG. 5 is a sequence diagram continued from FIG. 4.

Example Case C; FIGS. 4 and 5

Referring to FIGS. 4 and 5, a description will be provided on Case C illustrating a sequence of a sign-up process for the notification service. Case C may start with the state after Case A is completed, more specifically, the state where the serial number "SN1" of the printer 10A and the device ID "dv1" are stored in the administration server 200 in association with each other, and the printer 10A has received the device ID "dv1" from the administration server 200. That is, in the administration table 240 of the administration server 200, the administration data "MI1" (e.g., the administration account "MA1" and the priority "0"), the serial number "SN1", the device ID "dv1", the device token "DT1", the access token "AT1", and the print address "PA1" are stored in association with each other. In FIGS. 4 to 10, a description relating to the print address is omitted.

In response to accepting an operation for signing up for the notification service, the printer application 142 of the terminal 100A broadcasts search signals to the LAN 4 in step T110. The search signals are broadcasted to one or more printers (e.g., the printers 10A, 10B) belonging to the LAN 4. A search signal may be a signal requesting a printer to return a response including a serial number assigned to the printer. In step T112, the printer application 142 receives a response including the serial number "SN1" from the printer 10A. Although not illustrated, the printer application 142 also receives a response including the serial number "SN2" from the printer 10B. In step T114, the printer application 142 displays a device selection screen on the display 114. The device selection screen includes the serial number "SN1" and the serial number "SN2". Subsequent to step T114, in response to accepting selection of the serial number "SN1" in step T120, the printer application 142 transmits a device token request to the printer 10A in step T122. The device token request may be a signal requesting transmission of the device token corresponding to the printer 10A.

In response to receiving the device token request from the terminal 100A in step T122, the printer 10A identifies the device ID "dv1" stored in the memory 34. In step T124, the printer 10A transmits a device token request including the device ID "dv1" to the administration server 200.

In response to receiving the device token request from the printer 10A in step T124, the administration server 200 identifies, in the administration table 240, the device token "DT1" associated with the device ID "dv1" included in the received device token request. Subsequent to step T124, the administration server 200 transmits the device token "DT1" to the printer 10A in step T126. In response to receiving the device token "DT1" from the administration server 200 in step T126, the printer 10A transmits the device token "DT1" to the terminal 100A. In the illustrative embodiment, the administration server 200 generates the device token "DT1" simultaneously with the generation of the device ID "dv1" (refer to step T14 in FIG. 3). In other embodiments, the administration server 200 may generate the device token "DT1" in response to receiving the device token request.

In response to receiving the device token "DT1" from the printer 10A in step T128, the printer application 142 of the terminal 100A transmits a notification service sign-up request to the notification server 300. The service sign-up request includes the device token "DT1" and application data "AP1". The application data "AP1" includes a destination for transmitting notification data relating to a consumable item to the printer application 142.

In response to receiving the notification service sign-up request from the terminal 100A, the notification server 300 transmits an administration account generation request to the administration server 200 in step T132. The administration account generation request includes a priority flag "OFF". The priority flag indicates "OFF" or "ON". The priority flag "OFF" indicates that generation of administration data including priority "1" is requested. The priority flag "ON" indicates that generation of administration data including priority "2" is requested. The notification server 300 is configured to transmit an administration account generation request including the priority flag "OFF" to the administration server 200. The order server 400 is configured to transmit an administration account generation request including the priority flag "ON" to the administration server 200. Nevertheless, in other embodiments, the administration account generation request may include the priority instead of the priority flag. In this case, the notification server 300 may be configured to transmit an administration account generation request including priority "1" to the administration server 200. The order server 400 may be configured to transmit an administration account generation request including priority "2" to the administration server 200. In further other embodiments, each of the servers 300, 400 may transmit an administration account generation request including data indicating a type of a service provided by the respective server 300, 400 to the administration server 200. In this case, the administration server 200 determines the priority based on the data indicating the service type included in the administration account generation request.

In response to receiving the administration account generation request from the notification server 300 in step T132, the administration server 200 determines that the priority flag included in the administration account generation request indicates "OFF". In step T134, the administration server 200 generates administration data "MI2" including an administration account "MA2" and the priority "1", and temporarily stores the generated administration data "MI2" in the memory 234. Subsequent to step T134, in step T136, the administration server 200 transmits a generation completion notification to the notification server 300. The generation completion notification includes the generated administration account "MA2" and indicates that the generation of the administration account has completed.

In response to receiving the generation completion notification from the administration server 200 in step T136, the notification server 300 transmits a first replacement request to the administration server 200 in step T140. The first replacement request includes the received device token "DT1", the received administration account "MA2", and the server data "SI1". The server data "SI1" includes the URL of the notification server 300. The first replacement request may be a signal requesting to replace the existing administration data associated with a particular device ID authenticated by the device token included in the first replacement request with administration data including the administration account included in the first replacement request.

In step T140, the administration server 200 receives the first replacement request including the device token "DT1" from the notification server 300. Thus, the administration server 200 determines that the device token "DT1" included in the first replacement request matches the device token "DT1" included in the administration table 240, thereby determining that the authentication of the device token "DT1" has succeeded. Subsequent to step T140, the administration server 200 identifies, in the administration table 240, the administration data "MI1" associated with the device token "DT1" included in the first replacement request. The administration data "MI1" includes the administration account "MA1" and the priority "0". Thereafter, the administration server 200 identifies, in the memory 234, the administration data "MI2" (e.g., the administration account "MA2" and the priority "1") including the administration account that matches the administration account "MA2" included in the first replacement request. Subsequent to step T140, in step T142, the administration server 200 determines that the priority (e.g., "1") assigned to the administration account "MA2" is higher than the priority (e.g., "0") assigned to the administration account "MA1". In step T144, the administration server 200 replaces the existing administration data "MI1" associated with the device ID "dv1" with the administration data "MI2" in the administration table 240. Further, the administration server 200 stores the server data "SI1" in the administration table 240 in association with the administration data "MI2". Thus, in the administration table 240, the administration data "MI2" (e.g., the administration account "MA2" and the priority "1"), the serial number "SN1", the device ID "dv1", the device token "DT1", the access token "AT1", and the server data "SI1" are stored in association with each other. Subsequent to step T144, referring to FIG. 5, in step T146, the administration server 200 transmits a replacement completion notification to the notification server 300. The replacement completion notification indicates that the replacement of the administration data has completed.

In response to receiving the replacement completion notification from the administration server 200 in step T146, the notification server 300 stores the received application data "AP1" and the received administration account "MA2" in the notification table 340 in association with each other in step T150. Subsequent to step T150, in step T160, the notification server 300 transmits a first notification request to the administration server 200. The first notification request includes the administration account "MA2". The first notification request may be a signal requesting the administration server 200 to, in response to receiving consumable item data from a printer 10, further transmit the consumable item data to the notification server 300. The consumable item data includes data about a particular consumable item used in the printer 10 identified by the device ID associated with the administration account included in the first notification request. In response to receiving a setting completion notification from the administration server 200 in step T162, the notification server 300 transmits a first service-sign-up completion notification to the terminal 100A in step T164.

Subsequent to step T164, in step T170, the administration server 200 transmits a consumable item data request to the printer 10A. The consumable item data request may be a signal requesting transmission of consumable item data. The consumable item data includes, for example, the device ID "dv1" and life data. In response to receiving the consumable item data request from the administration server 200, the printer 10A transmits consumable item data to the administration server 200 every time a first time period (e.g., 24 hours) elapses. The consumable item data includes the device ID "dv1" and life data.

When the first time period has elapsed since the administration server 200 transmitted the consumable item data request, in step T180, the administration server 200 receives first consumable item data from the printer 10A. The first consumable item data includes life data and the device token "DT1". The life data indicates a remaining life of a particular consumable item (hereinafter, simply referred to as life). In this case, the life indicates "20". The administration server 200 then identifies, in the administration table 240, the administration account "MA2" associated with the device ID "dv1" included in the received first consumable item data, and the server data "SI1". Subsequent to step T180, in step T182, the administration server 200 transmits second consumable item data to the notification server 300 using the server data "SI1". The second consumable item data includes the life data and the administration account "MA2".

In response to receiving the second consumable item data from the administration server 200 in step T182, the notification server 300 determines, in step T184, that the life "20" indicated by the life data in the second consumable item data is less than a first threshold "30", and identifies, in the notification table 340, the application data "AP1" associated with the administration account "MA2" included in the received second consumable item data. Subsequent to step T182, in step T186, the notification server 300 transmits a warning notification to the terminal 100A using the identified application data "AP1". The warning notification indicates that the life of a particular consumable item ends shortly. That is, the remaining life of the particular consumable item has reached the threshold.

In response to receiving the warning notification from the notification server 300 in step T186, the printer application 142 of the terminal 100A displays a notification screen including a message on the display 114 in step T188. The message indicates that the life of a particular consumable item ends shortly. Such a notification may thus enable the user of the terminal 100A to be notified that a spare consumable item needs to be purchased. As described above, in the order service, the administration account and the application data are used. The user of the terminal 100A may also receive the mail printing service after step T188 (refer to FIG. 5) ends. In other words, the user of the terminal 100A may receive the mail printing service if the administration account "MA2" and the device ID "dv1" are stored in the administration server 200 in association with each other.

Figure 6:
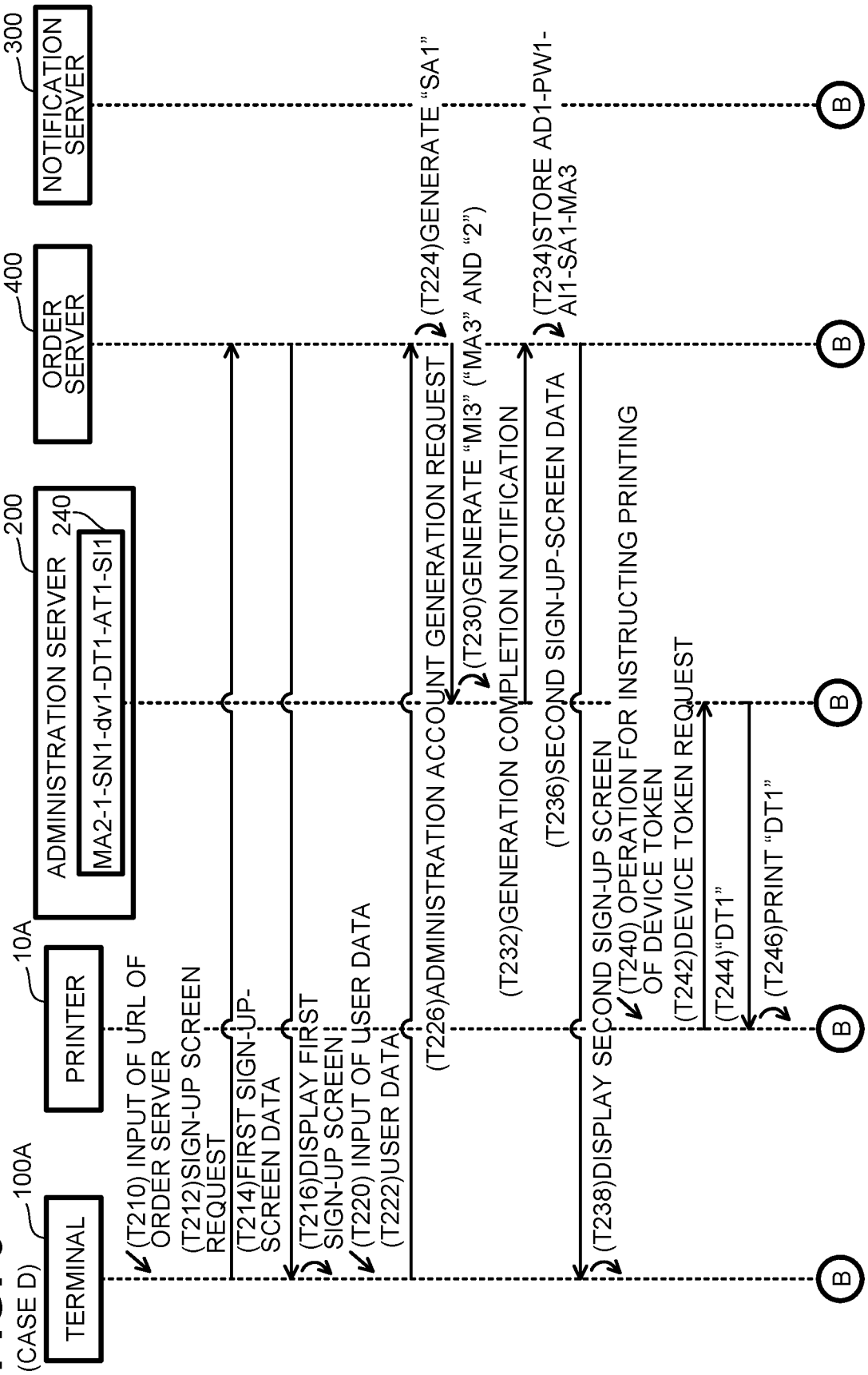
FIG. 6 is a sequence diagram of Case D illustrating a sign-up process for an order service.
Figure 7:
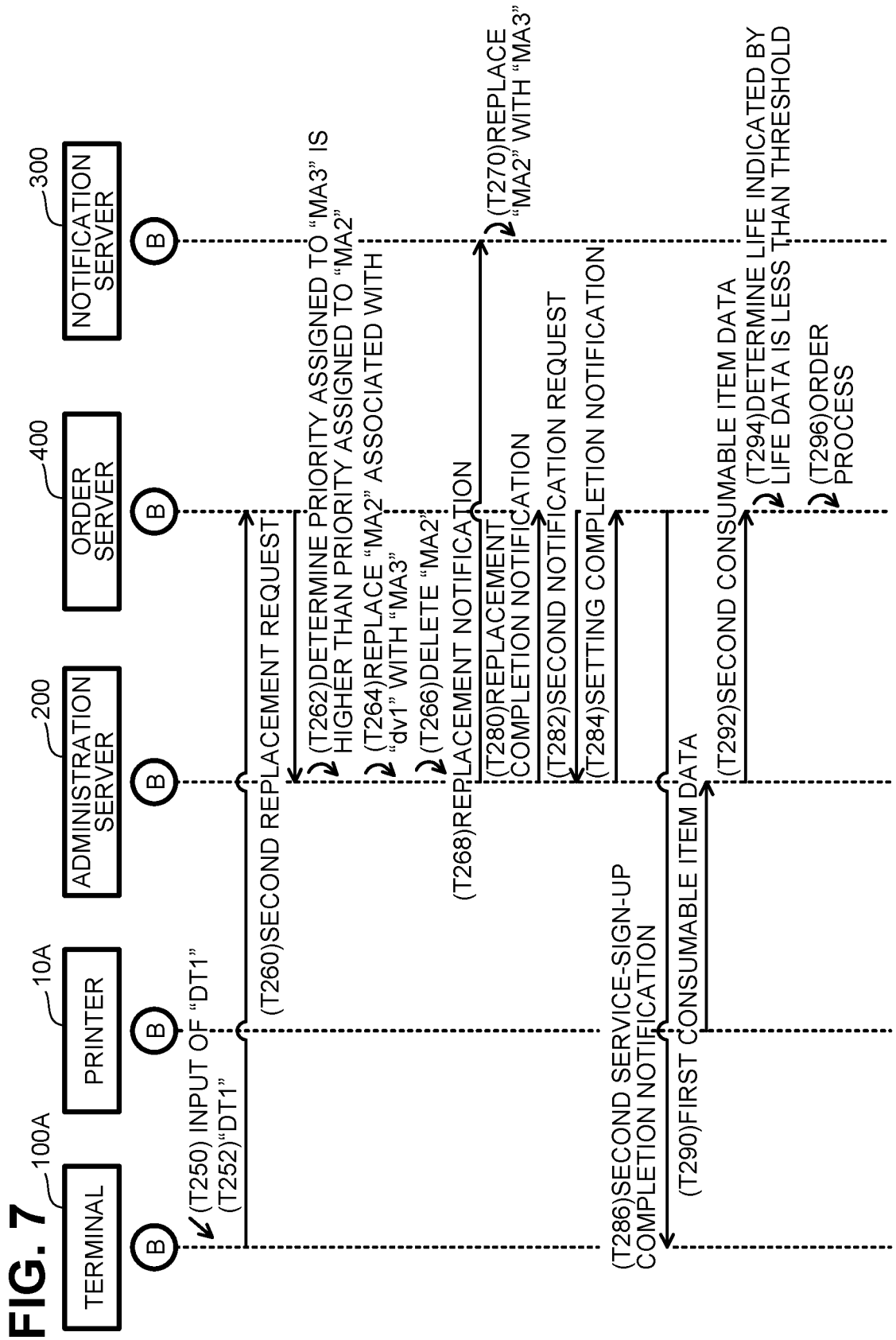
FIG. 7 is a sequence diagram continued from FIG. 6.

Example Case D; FIGS. 6 and 7

Referring to FIGS. 6 and 7, a description will be provided on Case D illustrating a sequence of a sign-up process for the order service. Case D may start with the state after Case C (refer to FIGS. 4 and 5) is completed. That is, in the administration table 240 of the administration server 200, the administration data "MI2" (e.g., the administration account "MA2" and the priority "1"), the serial number "SN1", the device ID "dv1", the device token "DT1", the access token "AT1", the server data "SI1", and the print address "PA1" are stored in association with each other. In the notification table 340 stored in the notification server 300, the application data "AP1" and the administration account "MA2" are stored in association with each other.

In response to accepting input of the URL of the order server 400 in step T210, the browser application 144 of the terminal 100A transmits a sign-up screen request to the order server 400 in step T212. In response, the browser application 144 receives first sign-up-screen data from the order server 400 in step T214, and displays a first sign-up screen on the display 114 in step T216. The first sign-up screen enables the user to input user data. In response to accepting input of the user data in step T220, the browser application 144 transmits the user data to the order server 400 in step T222. The input user data includes a mail address "AD1", a password "PW1", and an address data "AI1".

In response to receiving the user data from the terminal 100A in step T222, the order server 400 generates a service account "SA1" in step T224. Subsequent to step T224, the order server 400 transmits an administration account generation request to the administration server 200 in step T226. The administration account generation request includes the priority flag "ON".

In response to receiving the administration account generation request from the order server 400 in step T226, the administration server 200 identifies that the priority flag included in the administration account generation request indicates "ON". In step T230, the administration server 200 generates administration data "MI3" including an administration account "MA3" and priority "2", and temporarily stores the generated administration data "MI3" in the memory 234. Subsequent to step T224, in step T232, the administration server 200 transmits a generation completion notification to the notification server 400. The generation completion notification includes the generated administration account "MA3" and indicates that the generation of the administration account has completed.

In response to receiving the generation completion notification from the administration server 200 in step T232, the order server 400 stores the received user data, the generated service account "SA1", and the received administration account "MA3" in the order table 440 in association with each other in step T234. Subsequent to step T234, the order server 400 transmits second sign-up-screen data to the terminal 100A in step T236.

In response to receiving the second sign-up-screen data from the order server 400 in step T236, the browser application 144 of the terminal 100A displays a second sign-up screen on the display 114 in step T238. The second sign-up screen enables the user to input a device token. The second sign-up screen includes a message indicating how to print the device token of the printer 10 (e.g., the printer 10A in this case) for which the order service is provided.

In response to accepting an operation for instructing printing of the device token in step T240, the printer 10A transmits a device-token request including the device ID "dv1" to the administration server 200 in step T244. In step T244, the printer 10A receives the device token "DT1" from the administration server 200. In step T246, the printer 10A prints an image including a text string indicating the device token "DT1". This allows the user to be notified the device token "DT1".

Referring to FIG. 7, in response to accepting the input of the device token "DT1" in step T250, the browser application 144 of the terminal 100A transmits the device token "DT1" to the order server 400 in step T252.

In response to receiving the device token "DT1" from the terminal 100A in step T252, the order server 400 transmits a second replacement request to the administration server 200 in step T260. The second replacement request includes the received device token "DT1", the received administration account "MA2" (refer to step T232 in FIG. 6), and the server data "SI2". The server data "SI2" includes the URL of the order server 400. The second replacement request may be a signal requesting to replace the existing administration data associated with a particular device ID authenticated by the device token included in the second replacement request with administration data including the administration account included in the second replacement request.

In step T260, the administration server 200 receives the second replacement request including the device token "DT1" from the order server 400. Thus, the administration server 200 determines that the device token "DT1" included in the second replacement request matches the device token "DT1" included in the administration table 240, thereby determining that the authentication of the device token "DT1" has succeeded. Subsequent to step T260, the administration server 200 identifies, in the administration table 240, the administration data "MI2" associated with the device token "DT1" included in the second replacement request. The administration data "MI2" includes the administration account "MA2" and the priority "1". Thereafter, the administration server 200 identifies, in the memory 234, the administration data "MI3" (e.g., the administration account "MA3" and the priority "2") including the administration account that matches the administration account "MA3" included in the second replacement request. Subsequent to step T260, in step T262, the administration server 200 determines that the priority "2" assigned to the administration account "MA3" is higher than the priority "1" assigned to the administration account "MA2". In step T264, the administration server 200 replaces the existing administration data "MI2" associated with the device ID "dv1" with the administration data "MI3" in the administration table 240. Further, the administration server 200 stores the server data "SI2" in the administration table 240 in association with the administration data "MI3". Thus, in the administration table 240, the administration data "MI3" (e.g., the administration account "MA3" and the priority "2"), the serial number "SN1", the device ID "dv1", the device token "DT1", the access token "AT1", and the server data "SI1", "SI2" are stored in association with each other. Then, the administration server 200 determines that the administration table 240 does not include the device ID associated with the administration data "MI2", and deletes the administration data "MI2" from the administration table 240 in step T266. Subsequent to step T266, in step T268, the administration server 200 transmits a replacement notification to the notification server 300 using the server data "SI1". The replacement notification indicates that the administration account "MA2" associated with the device ID "dv1" has been replaced with the administration account "MA3".

In response to receiving the replacement notification from the administration server 200 in step T268, the notification server 300 replaces the existing administration account "MA2" with the administration account "MA3" in the notification table 340 in step T270.

Subsequent to step T270, in step T280, the administration server 200 transmits a replacement completion notification to the order server 400. The replacement completion notification indicates that the replacement of the administration account has completed.

In response to receiving the replacement completion notification from the administration server 200 in step T280, the order server 400 transmits a second notification request to the administration server 200 in step T282. The second notification request includes the administration account "MA3". The second notification request may be a signal requesting the administration server 200 to, in response to receiving consumable item data from a printer 10, further transmit the consumable item data to the order server 400. The consumable item data includes data about a particular consumable item used in the printer 10 identified by the device ID associated with the administration account included in the second notification request. In response to receiving a setting completion notification from the administration server 200 in step T284, the order server 400 transmits a second service-sign-up completion notification to the terminal 100A in step T286.

Step T290 is the same as step T180 (refer to FIG. 5). More specifically, step T292 is the same as step T182 except that the administration account "MA3" is included in the second consumable item data. In response to receiving the second consumable item data from the administration server 200 in step T292, the order server 400 determines, in step T294, that the life "20" indicated by the life data in the second consumable item data is less than a second threshold "30", and identifies, in the order table 440, the address data "AI1" associated with the administration account "MA3" included in the received second consumable item data. The second threshold may have a value that is the same as or different from the value of the first threshold. Subsequent to step T294, in step T296, the order server 400 executes an ordering process in step T296 using the identified address data "AI1". Thus, an appropriate spare item is delivered to the user. As described above, in the order service, the administration account and the user data are used. The order service is different from the notification service in that the application data is not used and the user data is used. The user of the terminal 100A may also receive the mail printing service and the notification service after step T296 (refer to FIG. 7) ends. In other words, the user of the terminal 100A may receive the mail printing service if the administration account "MA3" and the device ID "dv1" are stored in the administration server 200 in association with each other.

Figure 8:
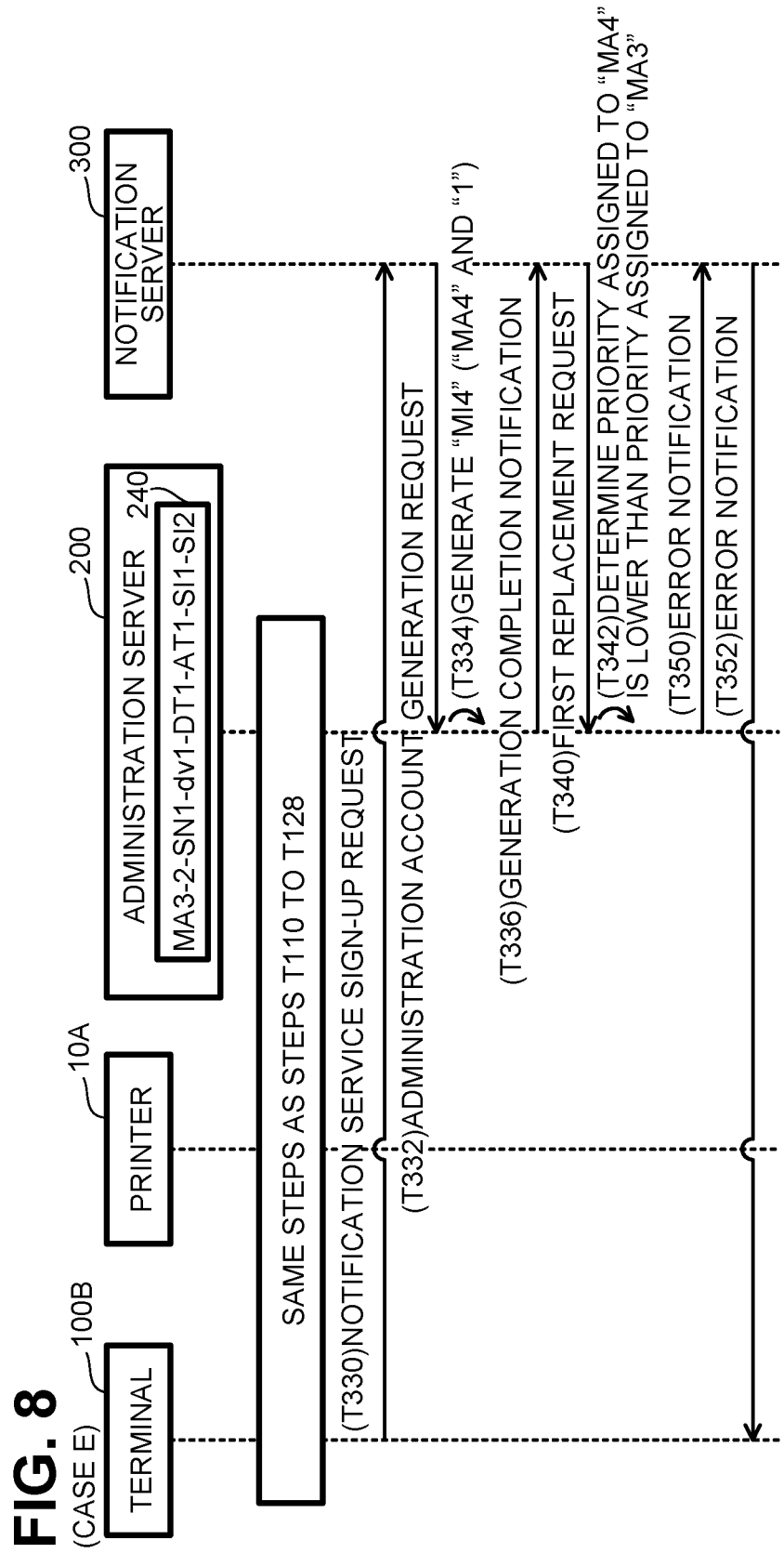
FIG. 8 is a sequence diagram of Case E in which the sign-up process for the notification service fails.

Example Case E; FIG. 8

Referring to FIG. 8, a description will be provided on Case E describing a situation in which the sign-up process for the notification service fails. Case E may start with the state after Case D (refer to FIG. 7) is completed. That is, in the administration table 240 of the administration server 200, the administration data "MI3" (e.g., the administration account "MA3" and the priority "2"), the serial number "SN1", the device ID "dv1", the device token "DT1", the access token "AT1", the server data "SI1", "SI2" and the print address "PA1" are stored in association with each other. In the notification table 340 of the notification server 300, the application data "AP1" and the administration account "MA3" are stored in association with each other. In the order table 440 of the order server 400, the mail address "AD1", the password "PW1", the address data "AI1", the service account "SA1", and the administration account "MA3" are stored in association with each other.

First, between the terminal 100B, the printer 10A, and the administration server 200, the same steps as steps T110 to T128 (refer to FIG. 4) are executed. In response to receiving the device token "DT1" from the printer 10A, in step T330, a printer application of the terminal 100B transmits a notification service sign-up request to the notification server 300. The notification service sign-up request includes the device token "DT1" and the application data "AP2". The application data "AP2" includes a destination for transmitting notification data relating to a consumable item to a printer application of the terminal 100B.

Step T332 is the same as step T132 (refer to FIG. 4). In step T334, the administration server 200 generates administration data "MI4" including an administration account "MA4" and the priority "1". Step T336 is the same as step T136 except that a generation completion notification transmitted in step T336 includes the administration account "MA4". Step T340 is the same as to step T140 except that the first replacement request transmitted in step T340 includes the administration account "MA4".

In response to receiving the first replacement request from the notification server 300 in step T340, the administration server 200 determines that authentication of the device token "DT1" has succeeded. Thus, the administration server 200 identifies, in the administration table 240, the administration data "MI3" (e.g., the administration account "MA3" and the priority "2") associated with the device token "DT1" included in the first replacement request. Thereafter, the administration server 200 identifies, in the memory 234, the administration data "MI4" (e.g., the administration account "MA4" and the priority "1") including the administration account that matches the administration account "MA4" included in the first replacement request. Subsequent to step T340, in step T342, the administration server 200 determines that the priority "1" assigned to the administration account "MA4" is not higher than the priority "2" assigned to the administration account "MA3". In this case, the administration server 200 does not replace the existing administration data "MI3" associated with the device ID "dv1" in the administration table 240 with the administration data "MI4". Subsequent to step T342, in step T350, the administration server 200 transmits an error notification to the notification server 300. The error notification indicates that the replacement of the administration data has failed.

In response to receiving the error notification from the administration server 200 in step T350, the notification server 300 transmits the error notification to the terminal 100B in step T352. Such a notification may thus enable the user of the terminal 100B to be notified that the sign-up for the notification service has failed.

Effects Achieved in Cases A to E

As illustrated in case D (refer to FIG. 7), in a state where the administration account "MA2" and the device ID "dv1" are stored in the administration table 240 in association with each other, the administration server 200 receives a second replacement request including the administration account "MA3" from the order server 400 (e.g., step T260). If the administration server 200 determines that the priority assigned to the administration account "MA3" is higher than the priority assigned to the administration account "MA2" (e.g., step T262), the administration server 200 replaces the existing administration account "MA2" with the received administration account "MA3" and stores the administration account "MA3" and the device ID "dv1" in the administration table 240 in association with each other (e.g., step T264). On the other hand, as illustrated in case E (refer to FIG. 8), in a state where the administration account "MA3" and the device ID "dv1" are stored in the administration table 240 in association with each other, the administration server 200 receives a first replacement request including the administration account "MA4" from the notification server 300 (e.g., step T340). If the administration server 200 determines that the priority assigned to the administration account "MA4" is not higher than the priority assigned to the administration account "MA3" (e.g., step T342), the administration server 200 does not replace the existing administration account "MA3" with the administration account "MA4" (e.g., step T264). Such a control may thus enable the administration server 200 to appropriately replace the existing administration account associated with the device ID "dv1" with another administration account depending on the situation.

In particular, in the illustrative embodiment, the priority "2" assigned to the administration account (e.g., the administration account "MA3") for providing the order service is higher than the priority "1" assigned to the administration account (e.g., the administration accounts "MA2" and "MA4") for providing the notification service. The order service may provide greater convenience to the user than the notification service. Thus, the user may be less likely to desire to receive the notification service instead of the order service after the sign-up process for the order service is completed. That is, in a case where the administration server 200 receives an administration account for providing the notification service after the sign-up process for the order service is completed, it is highly probable that the user erroneously performs a sign-up operation for the notification service. According to the above control, in a case where the administration account "MA2" associated with the device ID "dv1" is for providing the notification service and the administration account "MA3" included in the second replacement request is for providing the order service, the administration server 200 determines that the priority assigned to the administration account "MA3" is higher than the priority assigned to the administration account "MA2" (e.g., step T262 in FIG. 7). In a case where the administration account "MA3" associated with the device ID "dv1" is for providing the order service and the administration account "MA2" included in the first replacement request is for providing the notification service, the administration server 200 determines that the priority assigned to the administration account "MA2" is not higher than the priority assigned to the administration account "MA3" (e.g., step T342 in FIG. 8). Such a control may thus enable the administration server 200 to appropriately determine, in accordance with a user's intention, whether the existing administration account associated with the device ID "dv1" needs to be replaced.

The first replacement request (e.g., step T140 in FIG. 6, and step T340 in FIG. 8) and the second replacement request (e.g., step T260 in FIG. 7) do not include a device ID but include a device token. The device ID is more secure than the device token. Thus, as compared with a case where the first replacement request and the second replacement request include a device ID, data may be more secured in the illustrative embodiment.

As illustrated in case D (refer to FIG. 7), the administration server 200 transmits a replacement notification to the notification server 300 by using the server data "SI1" included in the administration table 240 (e.g., step T268). The replacement notification indicates that the existing administration account "MA2" stored in association with the device ID "dv1" has been replaced with the administration account "MA3". According to the above control, the same administration account may be stored in the administration table 240 of the administration server 200 and in the notification table 340 of the notification server 300. In the administration table 240 of the administration server 200, the administration account is associated with the device ID "dv1". In the illustrative embodiment, in a case where the administration account associated with the device ID "dv1" in the administration table 240 of the administration server 200 matches the administration account stored in the notification table 340 of the notification server 300, the administration server 200 and the notification server 300 may be enabled to provide the notification service. In some cases, the user may desire to receive the notification service after the sign-up process for the order service is completed. The above control may enable the administration server 200 to provide the notification service after the sign-up process for the order service is completed. Such a control may thus provide greater convenience to the user.

Example Case F; FIG. 9

Referring to FIG. 9, a description will be provided on Case F describing a situation in which the sign-up process for the order service fails. Case F may start with the state after Case E (refer to FIG. 8) is completed, more specifically, the state where the administration account "MA3" and the device ID "dv1" are stored in the administration server 200 in association with each other.

First, between the terminal 100B, the printer 10A, the administration server 200, and the order server 400, the same steps as steps T210 to T246 (refer to FIG. 6) are executed. In Case F, the printer application of the terminal 100B accepts input of user data including a mail address "AD2", a password "PW2", and address data "AI2" in step T220. In step T224, the order server 400 generates a service account "SA2". In step T230, the administration server 200 generates administration data "MI5" including an administration account "MA5 and "priority "2".

Subsequent to step T230, in response to accepting input of the device token "DT1" in step T450, the browser application of the terminal 100B transmits the device token "DT1" to the order server 400 in step T452.

In response to receiving the device token "DT1" from the terminal 100B in step T452, the order server 400 transmits a second replacement request to the administration server 200 in step T460. The second replacement request includes the received device token "DT1", the received administration account "MA5", and the server data "SI2".

In response to receiving a second replacement request from the order server 400 in step T460, the administration server 200 determines that authentication of the device token "DT1" has succeeded and thus identifies, in the administration table 240, the administration data "MI3" (e.g., the administration account "MA3" and the priority "2") associated with the device token "DT1" included in the second replacement request. Thereafter, the administration server 200 identifies, in the memory 234, the administration data "MI5" (e.g., the administration account "MA5" and the priority "2") including the administration account that matches the administration account "MA5" included in the second replacement request. Subsequent to step T460, in step T462, the administration server 200 determines that the priority "2" assigned to the administration account "MA5" is not higher than the priority "2" assigned to the administration account "MA3". In this case, the administration server 200 does not replace the existing administration data "MI3" associated with the device ID "dv1" in the administration table 240 with the administration data"MI5". Steps T470 and T472 are the same as steps T350 and T352 (refer to FIG. 8), respectively, except that the communication target is the order server 400 but not the notification server 300.

Effects Achieved in Case F

As illustrated in case F (refer to FIG. 9), in a state where the administration account "MA3" and the device ID "dv1" are stored in the administration table 240 in association with each other, the administration server 200 receives a second replacement request including the administration account "MA5" from the order server 400 (e.g., step T460). If the administration server 200 determines that the priority "2" assigned to the administration account "MA5" is equal to the priority "2" of the administration account "MA3" (e.g., step T462), the administration server 200 does not replace the existing administration account "MA3" with the administration account "MA5" (e.g., step T470). In a state where the administration account "MA3" and the device ID "dv1" are stored in the administration table 240 in association with each other, there may be some cases where replacement of the existing administration account stored in association with the device ID "dv1" to another administration account having an equal priority is not appropriate. For example, assuming that the existing administration account "MA3" stored in the administration table 240 in association with the device ID "dv1" is replaced with the administration account "MA5", the user data associated with the device ID "dv1" is also replaced correspondingly. In this case, the user of the terminal 100A might not receive the order service any more. Stopping the order service to the user of the terminal 100A needs to be avoided if the user desires to receive the order service. According to the above control, in a state where the administration account "MA3" and the device ID "dv1" are stored in the administration table 240 in association with each other, the existing administration account in association with the device ID "dv1" is not replaced with another administration account. Such a control may thus reduce stopping of the order service to the user of the terminal 100A without the user's permission.

Example Case G; FIG. 10

Referring to FIG. 10, a description will be provided on Case G describing a situation in which the administration data "MI2" is not deleted in the sign-up process for the notification service. Case G may start with the state after Case D (refer to FIGS. 6 and 7) is completed, more specifically, the state where the administration account "MA2" and the device ID "dv1" are stored in the administration server 200 in association with each other.

First, between the printer 10B and the administration server 200, the same steps as steps T10 to T26 (refer to FIG. 3) are executed. In step T12, the printer 10B transmits a device registration request to the administration server 200. In Case G, the device registration request includes the serial number "SN2". Subsequent to step T12, in step T14, the administration server 200 generates administration data "MI6", a device ID "dv2", a device token "DT2", and an access token "AT2". The administration data "MI6" includes an administration account "MA6" and priority "0". In step T16, the administration server 200 stores the administration data "MI6", the serial number "SN2", the device ID "dv2", the device token "DT2", and the access token "AT2" (MA6-0-SN2-dv2-DT2-AT2) in the administration table 240 in association with each other.

Subsequent to step T16, between the terminal 100A, the printer 10B, and the administration server 200, the same steps as steps T110 to T128 (refer to FIG. 4) are executed. In Case G, in step T128, the printer application 142 of the terminal 100A receives the device token "DT2". Subsequent to step T128, the printer application 142 transmits a notification service sign-up request to the notification server 300 in step T530. The notification service sign-up request includes the device token "DT2" and the application data "AP1".

In response to receiving the notification service sign-up request from the terminal 100A in step T530, the notification server 300 identifies, in the notification table 340, the administration account "MA2" associated with the application data "AP1" included in the received notification service sign-up request. In step T532, the notification server 300 transmits a third replacement request to the administration server 200. The third replacement request includes the received device token "DT2", the stored administration account "MA2", and the server data "SI1". The third replacement request may be a signal requesting to replace the existing administration data associated with a particular device ID authenticated by the device token included in the third replacement request with administration data including the administration account included in the third replacement request.

In response to receiving the third replacement request from the notification server 300 in step T532, the administration server 200 determines that the priority "1" assigned to the administration account "MA2" is higher than the priority "0" assigned to the administration account "MA6". In step T534, the administration server 200 replaces the existing administration data "MI6" associated with the device ID "dv2" with the administration data "MI2" in the administration table 240. Thus, the administration data "MI2" (e.g., the administration account "MA2" and the priority "1"), the serial number "SN1", the device ID "dv1", the device token "DT1", the access token "AT1", the server data "SI1" (MA2-1-SN1-dv1-DT1-AT1-SI1) are stored in association with each other in the administration table 240. In addition, the administration data "MI2" (e.g., the administration account "MA2" and the priority "1"), the serial number "SN2", the device ID "dv2", the device token "DT2", the access token "AT2", the server data "SI1" (MA2-1-SN2-dv2-DT2-AT2-SI1) are stored in association with each other in the administration table 240. Subsequent to step T534, between the terminal 100A, the administration server 200, and the notification server 300, the same steps as steps T146 to T164 (refer to FIG. 5) are executed. In Case G, in step T150, the notification server 300 stores the application data "AP1" and the administration account "MA2" in the notification table 340 in association with each other.

Then, between the terminal 100A, the printer 10A, the administration server 200, and the order server 400, the same steps as steps T210 to T246 (refer to FIG. 6) and steps T250 and T252 (refer to FIG. 7) are executed. Step T560 is the same as step T260 (refer to FIG. 7). In response to receiving a second replacement request from the order server 400 in step T560, the administration server 200 determines that authentication of the device token "DT1" has succeeded and thus identifies, in the administration table 240, the administration data "MI2" (e.g., the administration account "MA2" and the priority "1") associated with the device token "DT1" included in the second replacement request. Thereafter, the administration server 200 identifies, in the memory 234, the administration data "MI3" (e.g., the administration account "MA3" and the priority "2") including the administration account that matches the administration account "MA3" included in the third replacement request. Subsequent to step T560, in step T562, the administration server 200 determines that the priority "2" assigned to the administration account "MA3" is higher than the priority "1" assigned to the administration account "MA2". In step T564, the administration server 200 replaces the existing administration data "MI2" associated with the device ID "dv1" with the administration data "MI3" in the administration table 240. Further, the administration server 200 stores the server data "SI2" in the administration table 240 in association with the administration data "MI3" (MA3-2-SN1-dv1-DT1-AT1-SI1-SI2). The administration server 200 however does not replace the existing administration data "MI2" associated with the device ID "dv2" with the administration data "MI3" in the administration table 240 (MA2-1-SN2-dv2-DT2-AT2-SI1). In this case, the administration server 200 does not delete the administration data "MI2". Subsequent to step T564, between the terminal 100A, the administration server 200, and the notification server 300, and the order server 400, the same steps as steps T268 to T286 (refer to FIG. 7) are executed.

Effects Achieved in Case G

As illustrated in case G (refer to FIG. 10), the administration account "MA2" and the device ID "dv1" are stored in the administration table 240 in association with each other and the administration account "MA2" and the device ID "dv2" are stored in the administration table 240 in association with each other. If the administration server 200 determines that the priority "2" assigned to the administration account "MA3" is higher than the priority "1" assigned to the administration account "MA2", the administration server 200 replaces the existing administration account "MA2" associated with the device ID "dv1" with the administration account "MA3" in the administration table 240 but does not replace the existing administration account "MA2" associated with the device ID "dv2" with the administration account "MA3" in the administration table 240 (e.g., step T564 in FIG. 10). Such a control may thus reduce cancellation of the association between the administration account "MA2" and the device token "dv2" when the user does not desire to cancel the association therebetween. In the illustrative embodiment, if the administration account "MA2" is deleted after step T564, the administration server 200 might not identify the administration account corresponding to the device token "dv2" included in a first consumable-item-data request in response to receiving the first consumable item data request from the printer 10B. In this case, the administration server 200 does not transmit second consumable item data. That is, the notification service to the user of the terminal 100A may be stopped. On the other hand, in a case where the association between the administration account "MA2" and the device token "dv2" is maintained, the administration server 200 transmits second consumable item data to the order server 400. Thus, the notification server 300 transmits a warning notification to the printer application 142 of the terminal 100A. Thus, the notification service may be continuously provided to the user of the terminal 100A.

Correspondences

The administration server 200 is an example of a server. The memory 234 of the administration server 200 is an example of memory. The printer 10A is an example of a first communication device. Each of the administration accounts "MA2" to "MA5" is an example of first account data. Each of the administration account "MA2" and the administration account "MA3" is an example of second account data. The device ID "dv1" is an example of first device-identification data. Each of the notification server 300 and the order server 400 is an example of a first external device. Each of the first replacement request and the second replacement request is an example of a first request. A combination of the first account data and the first device-identification data is an example of first combination data.

The device token "DT1" is an example of first authentication data. The notification service is an example of a first service. The order service is an example of a second service. The printer application 142 is an example of an application program. The application data "AP1" is an example of application data. The device registration request is an example of a second request. The administration account "MA1" is an example of third account data. Each of the first replacement request and the second replacement request is an example of a third request. Each of the notification server 300 and the order server 400 is an example of a second external device. A combination of the first account data, the first device-identification data, and the first authentication data is an example of second combination data. The server data "SI1" is an example of location data of the second external device. The mail printing service is an example of a third service. The image file "F1" is an example of first data. The print data "PD1" is an example of second data. The printer 10B is an example of a second communication device. The device ID "dv2" is an example of second device-identification data. A combination of the first account data and the second device-identification data is an example of third combination data.

While the disclosure has been described in detail with reference to the specific embodiment thereof, this is merely an example, and various changes, arrangements and modifications may be applied therein without departing from the spirit and scope of the disclosure. Modifications of the illustrative embodiment are described below.

In the illustrative embodiment, the administration server 200 generates a device token. In modifications, the printer 10A may generate a device token. In this case, the device token generated by the printer 10A is another example of the first device-identification data.

In other modifications, each of the first replacement request and the second replacement request may include the serial number "SN1" of the printer 10A instead of a device token. In this case, the serial number "SN1" is another example of the first device-identification data. Further, the first request includes the first device-identification data but does not include the first authentication data.

In other modifications, the administration table 240 stored in the administration server 200 might not necessarily store the priority. For example, an administration account may include a text string corresponding to each service. In this case, the administration server 200 determines the priority based on the text string included in the administration account.

In the illustrative embodiment, the administration server 200 uses three levels within the range from "0" to "2" in the priority. Nevertheless, in other modifications, the number of priority levels is not limited to three, and may be two, or four or more.

In the illustrative embodiment, the administration server 200 determines whether to replace the existing administration account associated with the device ID based on the type of the service requested to be provided. Nevertheless, in other modifications, the administration server 200 may determine whether to replace the existing administration account associated with the device ID on a user basis. In such a case, for example, in a case where a first administration account corresponds to a first user of the terminal 100A and a second administration account corresponds to a second user of the terminal 100B, the administration server 200 may determine that the priority assigned to the second administration account is higher than the priority assigned to the first account data. In a case where the first administration account corresponds to the second user of the terminal 100B and the second administration account corresponds to the first user of the terminal 100A, the administration server 200 may determine that the priority assigned to the second administration account is not higher than the priority assigned to the first administration account.

In other modifications, the order service may be another example of the first service, and a paid service may be another example of the second service.

In other modifications, a first remote printing service using the administration server 200 and a fourth server may be another example of the first service. In the first remote printing service, the printer application 142 of the terminal 100A transmits an image file and the device token "DT1" to a first server different from the servers 200, 300, 400. The first server includes a memory, and the device token "DT1" and the administration account "MA3" are stored in the memory of the first server in association with each other. In response to receiving the image file and the device token "DT1" from the terminal 100A, the first server identifies the administration account "MA3" associated with the received device token "DT1", and transmits the image file and the administration account "MA3" to the administration server 200. In response to receiving the image file and the administration account "MA3" from the first server, the administration server 200 identifies the printer 10A corresponding to the administration account "MA3" as a target printer. Then, the administration server 200 converts the received image file into a print file and transmits a print instruction including the print file to the printer 10A. In response to receiving the print instruction from the administration server 200, the printer 10A stores the print instruction in the memory 34. Thereafter, in response to accepting an operation for instructing printing of the print data stored in the memory 34, the printer 10A prints an image corresponding to the print data. A paid service may provide printing on a predetermined number of pages (e.g., 200 pages) in a certain time period (e.g., per month) on a fixed-price basis. Such a paid service may be another example of the second service. In this case, the user data stored in the order table 440 of the order server 400 includes payment data.

In the illustrative embodiment, the administration server 200 provides the mail printing service. Nevertheless, in other modifications, the administration server 200 and a second server may provide the mail printing service. The second server is different from the servers 200, 300, 400. In this case, the print address "PA1" is not stored in the administration table 240 of the administration server 200. The second server includes a memory, and the administration account "MA1" and the print address "PA1" are stored in the memory of the second server in association with each other. In response to receiving an e-mail "EM1" from the terminal 100A in step T62 (refer to FIG. 3), the second server identifies the administration account "MA1" associated with the print address "PA1" in the memory of the second server and transmits a print instruction including the identified administration account "MA1" and an image file "F1" to the administration server 200. The subsequent steps are the same as steps T70 to T82. In other modifications, the second server may convert the image file "F1" to generate print data "PD1".

In other modifications, steps T12, T16, T140, and T144 may be omitted.

In other modifications, in step T268 (refer to FIG. 7), the administration server 200 may transmit, to the notification server 300, a deletion request to delete the administration account "MA2" instead of transmitting a replacement notification. In other modifications, step T268 (refer to FIG. 7) may be omitted.

In other modifications, a second remote printing service using the administration server 200 only may be another example of the third service. In this case, the printer application 142 of the terminal 100A transmits an image file and the device ID "dv1" to the administration server 200. In response to receiving the image file and the device ID "dv1" from the terminal 100A, the administration server 200 identifies the printer 10A identified by the device ID "dv1" as a target printer. Then, the administration server 200 converts the received image file into a print file and transmits a print instruction including the print file to the printer 10A.

In response to receiving the print instruction from the administration server 200, the printer 10A stores the print data in the memory 34. Thereafter, in response to accepting an operation for instructing printing of the print data stored in the memory 34, the printer 10A prints an image corresponding to the print data.

In other modifications, step T266 (refer to FIG. 7) may be omitted. In other modifications, the administration server 200 may delete the administration data "MI2" from the administration table 240 after step T564 (refer to FIG. 10).

In other modifications, in FIGS. 6 and 7, steps performed by the browser application 144 of the terminal 100A may be executed by the printer application 142.

In other modifications, the steps in FIGS. 3 to 10 are executed by software (e.g., the programs 36, 140, 142, 144, 236) but at least one of the steps may be executed by hardware such as a logic circuit.

The technical elements described in this specification or the drawings exhibit technical usefulness alone or in various combinations, and are not limited to the combinations described in the claims at the time of filing. The techniques illustrated in the present specification or the drawings achieve multiple objects simultaneously, and has technical utility by achieving one of the objects.

What is claimed is:
1. A server comprising:
memory; and
a controller configured to:
  in a state where first combination data is stored in the memory, receive a first request from a first external device, the first combination data including first account data and first device-identification data in association with each other, the first device-identification data identifying a first communication device, the first request including second account data different from the first account data and requesting replacement of the first account data associated with the first device-identification data in the first combination data with the second account data;
  in response to receiving the first request from the first external device, determine whether priority assigned to the second account data included in the first request is higher than priority assigned to the first account data associated with the first device-identification data stored in the memory;
  based on a determination that the priority assigned to the second account data included in the first request is higher than the priority assigned to the first account data associated with the first device-identification data stored in the memory, replace the first account data stored in the memory with the second account data included in the first request, thereby storing the second account data in the memory in association with the first device-identification data; and
  based on a determination that the priority assigned to the second account data included in the first request is not higher than the priority assigned to the first account data associated with the first device-identification data stored in the memory, not replace the existing first account data stored in the memory with the second account data included in the first request.
2. The server according to claim 1, wherein:
the first combination data further includes first authentication data in association with the first account data and the first device-identification data, the first request includes the second account data and the first authentication data, and the controller is further configured to, in response to receiving the first request from the first external device, determine whether the priority assigned to the second account data included in the first request is higher than priority assigned to the first account data associated with the first device-identification data included in the first request.

3. The server according to claim 1, wherein the controller is further configured to:
in a case where the first account data is for providing a first service and the second account data is for providing a second service different from the first service, determine that the priority assigned to the second account data is higher than the priority assigned to the first account data; and
in a case where the first account data is for providing the second service and the second account data is for providing the first service, determine that the priority assigned to the second account data is not higher than the priority assigned to the first account data.

4. The server according to claim 3, wherein:
the first service does not use user data, the user data to be input by a user of the first communication device, and
the second service uses the user data.

5. The server according to claim 4, wherein:
the first service does not use the user data and uses application data relating to an application program installed on a terminal, and
the second service does not use the application data and uses the user data.

6. The server according to claim 4, wherein:
the first service transmits notification data to an application program using application data, the application program having been installed on a terminal, the application data relating to the application program, the notification data indicating that a remaining life of a particular consumable item used in the first communication device has reached a threshold; and
the second service provides automatic ordering and delivery of a spare consumable item in response to the remaining life of the particular consumable item used in the first communication device having reached the threshold.

7. The server according to claim 1, wherein the controller is further configured to:
before the first combination data is stored in the memory, receive a second request from the first communication device, the second request requesting registration of the first communication device with the server;
in response to receiving the second request from the first communication device before the first combination data is stored in the memory, store second combination data in the memory, the second combination data including third account data and the first device-identification data in association with each other;
in a state where the second combination data is stored in the memory, receive a third request from a second external device, the third request including the first account data and requesting replacement of the third account data associated with the first device-identification data included in the second combination data with the first account data; and
in response to receiving the third request from the second external device in the state where the second combination data is stored in the memory, replace the third account data stored in the memory with the first account data included in the third request, thereby storing the first account data in the memory in association with the first device-identification data.

8. The server according to claim 7, wherein:
the second external device is different from the first external device,
the third request includes the first account data and location data of the second external device, and
the controller is further configured to:
store the first account data, the first device-identification data, and the location data in the memory in association with each other; and
based on the determination that the priority assigned to the second account data is higher than the priority assigned to the first account data, provide a replacement notification to the second external device using the location data stored in the memory, the replacement notification indicating that the first account data associated with the first device-identification data has been replaced with the second account data.

9. The server according to claim 7, wherein the third account data is used for providing a third service in which the third account data is not used.

10. The server according to claim 9, wherein the third service transmits second data to the first communication device, the second data being obtained using first data received from a terminal.

11. The server according to claim 1, wherein the controller is further configured to, in response to receiving the first request from the first external device and based on a determination that the priority assigned to the second account data included in the first request is higher than the priority assigned to the first account data associated with the first device-identification data stored in the memory, in a state where the first combination data and third combination data are stored in the memory, the third combination data including the first account data and second device-identification data in association with each other, replace the first account data associated with the first device-identification data stored in the memory with the second account data, and not replace the first account data associated with the second device-identification data stored in the memory with the second account data.

12. A non-transitory computer-readable medium storing computer-readable instructions for a server, the computer-readable instructions comprising instructions to implement:
in a state where first combination data is stored in a memory, receiving a first request from a first external device, the first combination data including first account data and first device-identification data in association with each other, the first device-identification data identifying a first communication device, the first request including second account data different from the first account and requesting replacement of the first account data associated with the first device-identification data in the first combination data with the second account data;
in response to receiving the first request from the first external device, determining whether priority assigned to the second account data included in the first request is higher than priority assigned to the first account data associated with the first device-identification data stored in the memory;
based on a determination that the priority assigned to the second account data included in the first request is higher than the priority assigned to the first account data associated with the first device-identification data stored in the memory, replacing the first account data stored in the memory with the second account data included in the first request, thereby storing the second account data in the memory in association with the first device-identification data; and based on a determination that the priority assigned to the second account data included in the first request is not higher than the priority assigned to the first account data associated with the first device-identification data stored in the memory, not replacing the existing first account data stored in the memory with the second account data included in the first request.

* * * * *